(12) United States Patent
Daboussi et al.

(10) Patent No.: US 11,581,769 B2
(45) Date of Patent: *Feb. 14, 2023

(54) STATOR WINDING HEAT SINK CONFIGURATION

(71) Applicant: AeroVironment, Inc., Monrovia, CA (US)

(72) Inventors: Zaher Abdallah Daboussi, Arcadia, CA (US); Lindsay Aspinwall Sheppard, Azusa, CA (US); Bart Dean Hibbs, Simi Valley, CA (US); Wally Ewald Rippel, Altadena, CA (US)

(73) Assignee: AeroVironment, Inc., Arlington, VA (US)

( * ) Notice: Subject to any disclaimer, the term of this patent is extended or adjusted under 35 U.S.C. 154(b) by 3 days.

This patent is subject to a terminal disclaimer.

(21) Appl. No.: 16/132,420

(22) Filed: Sep. 16, 2018

(65) Prior Publication Data

US 2019/0103780 A1 Apr. 4, 2019

Related U.S. Application Data

(63) Continuation of application No. 15/668,577, filed on Aug. 3, 2017, now Pat. No. 10,103,592, which is a
(Continued)

(51) Int. Cl.
*H02K 3/14* (2006.01)
*H02K 7/14* (2006.01)
(Continued)

(52) U.S. Cl.
CPC .................. *H02K 3/14* (2013.01); *H02K 3/30* (2013.01); *H02K 3/32* (2013.01); *H02K 3/47* (2013.01);
(Continued)

(58) Field of Classification Search
CPC .. H02K 3/14; H02K 7/14; H02K 9/22; H02K 16/02
(Continued)

(56) References Cited

U.S. PATENT DOCUMENTS 2,446,663 A * 8/1948 Palmatier ............... B64D 15/02
244/134 B
3,715,610 A * 2/1973 Brinkman ................ H02K 9/20
310/54
(Continued)

FOREIGN PATENT DOCUMENTS

CN 101056024 A 10/2007
CN 101093405 A 12/2007
(Continued)

OTHER PUBLICATIONS

International Searching Authority/US, International Search Report (ISR) and Written Opinion (WO) for corresponding PCT application PCT/US09/58118, entitled Stator Winding Heat Sink Configuration by Daboussi et al., dated Jan. 12, 2010, 7 pgs.
(Continued)

*Primary Examiner* — Jose A Gonzalez Quinones
(74) *Attorney, Agent, or Firm* — Christopher R. Balzan, Esq.; Eric J. Aagaard, Esq.

(57) ABSTRACT

In one possible implementation, a motor is provided including a rotor and a stator. Front cooling fins are thermally coupled to a front of the stator, and rear cooling fins are thermally coupled to a rear portion of the stator. The winding is between the front and rear cooling fins.

17 Claims, 5 Drawing Sheets

Related U.S. Application Data continuation of application No. 14/187,011, filed on Feb. 21, 2014, now Pat. No. 9,748,809, which is a continuation of application No. 12/565,710, filed on Sep. 23, 2009, now Pat. No. 8,723,378.

(60) Provisional application No. 61/194,099, filed on Sep. 23, 2008, provisional application No. 61/194,098, filed on Sep. 23, 2008, provisional application No. 61/194,056, filed on Sep. 23, 2008.

(51) Int. Cl.

| | | |
|---|---|---|
| *H02K 16/02* | (2006.01) | |
| *H02K 9/22* | (2006.01) | |
| *H02K 3/47* | (2006.01) | |
| *H02K 9/14* | (2006.01) | |
| *H02K 9/06* | (2006.01) | |
| *H02K 9/02* | (2006.01) | |
| *H02K 3/30* | (2006.01) | |
| *H02K 3/32* | (2006.01) | |
| *H02K 21/12* | (2006.01) | |

(52) U.S. Cl.
CPC ............... *H02K 7/14* (2013.01); *H02K 9/02* (2013.01); *H02K 9/06* (2013.01); *H02K 9/14* (2013.01); *H02K 9/227* (2021.01); *H02K 16/02* (2013.01); *H02K 21/12* (2013.01); *Y02E 10/72* (2013.01); *Y10T 29/49009* (2015.01)

(58) Field of Classification Search
USPC .................................. 310/52, 60 R, 216.014
See application file for complete search history.

(56) References Cited

U.S. PATENT DOCUMENTS

| | | | |
|---|---|---|---|
| 5,723,933 | A | 3/1998 | Grundl et al. |
| 6,157,109 | A | 12/2000 | Schiferl |
| 7,411,325 | B1 | 8/2008 | Gabrys |
| 7,663,873 | B2 | 2/2010 | Lau |
| 8,723,378 | B2 | 5/2014 | Daboussi et al. |
| 9,748,809 | B2 | 8/2017 | Daboussi et al. |
| 10,103,592 | B2 | 10/2018 | Daboussi et al. |
| 2001/0045782 | A1* | 11/2001 | Lieu ................ H02K 5/165 310/67 R |
| 2005/0067905 | A1* | 3/2005 | Maney ................ H02K 1/20 310/58 |
| 2006/0131985 | A1 | 6/2006 | Qu et al. |
| 2007/0024132 | A1* | 2/2007 | Salamah ............ F03D 1/06 310/64 |
| 2007/0108865 | A1 | 5/2007 | Jansen et al. |
| 2007/0273220 | A1 | 11/2007 | Koyama et al. |
| 2007/0278879 | A1* | 12/2007 | Kaminski ................ H02K 5/18 310/86 |
| 2008/0143200 | A1 | 6/2008 | Kalsi et al. |

FOREIGN PATENT DOCUMENTS

| | | | | |
|---|---|---|---|---|
| DE | 4414527 | C1 | 8/1995 | |
| EP | 0104450 | A2 | 4/1984 | |
| EP | 0387743 | A1 | 9/1990 | |
| EP | 0823769 | A1 | 2/1998 | |
| EP | 1843447 | A1 | 10/2007 | |
| GB | 2314692 | A | 1/1998 | |
| JP | 53086404 | A | 7/1978 | |
| JP | 61-147578 | | 9/1986 | |
| JP | 01-166477 | | 11/1989 | |
| JP | 03143247 | A * | 6/1991 | |
| JP | 06-070522 | A2 | 3/1994 | |
| JP | 09009575 | A | 1/1997 | |
| JP | 11-004554 | A2 | 1/1999 | |
| JP | 2002-013467 | A2 | 1/2002 | |
| JP | 2004357352 | A | 12/2004 | |
| JP | 2006075321 | A | 3/2006 | |
| JP | 2006101658 | A | 4/2006 | |
| JP | 2008125153 | A * | 5/2008 | |
| JP | 2008125324 | A | 5/2008 | |
| JP | 2008125324 | A * | 5/2008 | |
| WO | WO-9700201 | A1 * | 1/1997 | ............ B64D 15/12 |
| WO | WO2005022718 | A1 | 3/2005 | |
| WO | WO2007123058 | A1 | 11/2007 | |

OTHER PUBLICATIONS

Australian Government IP Australia, (AU_Exam_Rpt) Examiner's First Report for corresponding Australia case application No. 2009296684 entitled Stator Winding Heat Sink Configuration by Daboussi et al., Sep. 23, 2009, Australian Government Intellectual Property Australia, Sep. 9, 2011, 2 pgs.

European Patent Office (EPO); Supplementary European Search Report (ESR); and Annex to the ESR for corresponding European case application No. EP 09 81 6817 entitled Stator Winding Heat Sink Configuration by Daboussi et al.; dated Dec. 19, 2012 from European Patent Office; 8 pgs.

State Intellectual Property Office of the People's Republic of China (SIPO); English translation of First Office Action (OA) for corresponding Chinese case application No. 200980146818.1 entitled Stator Winding Heat Sink Configuration by Daboussi et al.; dated Jan. 4, 2013 from State Intellectual Property Office of the People's Republic of China; 9 pgs.

State Intellectual Property Office of the People's Republic of China (SIPO); English translation of Search Report (SR) for corresponding Chinese case application No. 200980146818.1 entitled Stator Winding Heat Sink Configuration by Daboussi et al.; dated Jan. 4, 2013 from State Intellectual Property Office of the People's Republic of China; 2 pgs.

Hungarian Intellectual Property Office (HIPO) Search and Examination Report (SR); for corresponding Singapore case application No. 201104424-5 entitled Stator Winding Heat Sink Configuration by Daboussi et al.; dated May 16, 2013 from Hungarian Intellectual Property Office; 16 pgs.

Japan Patent Office (JPO); English machine translation of First Office Action (OA) for corresponding Japanese case application No. 2011-529199 entitled Stator Winding Heat Sink Configuration by Daboussi et al.; dated Feb. 18, 2014, from Japan Patent Office; 8 pgs.

Korean Intellectual Property Office (KIPO); English translation of First Office Action (OA) for corresponding Korean case application No. 10-2011-7009317 entitled Stator Winding Heat Sink Configuration by Daboussi et al.; dated Feb. 2, 2016, from Korean Intellectual Property Office; 10 pgs.

Canadian Intellectual Property Office (CIPO); First Office Action (OA) and Examination Search Report for corresponding Canadian case application No. 2,774,934 entitled Stator Winding Heat Sink Configuration by Daboussi et al; dated Oct. 5, 2016, from Canadian Intellectual Property Office; 4 pgs.

Intellectual Property India (IPI); First Examination Report (FER) and Search Report for corresponding Indian case application No. 1661/KOLNP/2011 entitled Stator Winding Heat Sink Configuration by Daboussi et al; dated Jan. 18, 2018, from Intellectual Property India, 6 pgs.

* cited by examiner

STATOR WINDING HEAT SINK CONFIGURATION

CROSS REFERENCE TO RELATED APPLICATIONS

The present application is a continuation of U.S. application Ser. No. 15/668,577, filed Aug. 3, 2017, by Daboussi et al., entitled STATOR WINDING HEAT SINK CONFIGURATION, issued as U.S. Pat. No. 10,103,592, on Oct. 16, 2018, herein incorporated by reference in its entirety, which is a continuation of U.S. application Ser. No. 14/187,011, filed Feb. 21, 2014, by Daboussi et al., entitled STATOR WINDING HEAT SINK CONFIGURATION, issued as U.S. Pat. No. 9,748,809, on Aug. 29, 2017, herein incorporated by reference in its entirety, which is a continuation of U.S. application Ser. No. 12/565,710, filed Sep. 23, 2009; by Daboussi et al.; entitled STATOR WINDING HEAT SINK CONFIGURATION, issued as U.S. Pat. No. 8,723,378, on May 13, 2014, herein incorporated by reference in its entirety, which claims the benefit of the following applications which are all herein incorporated by reference in their entireties:
- U.S. Provisional Application No. 61/194,098, filed Sep. 23, 2008, by Daboussi, entitled WINDING DESIGN FOR IRONLESS P.H. MOTOR;
- U.S. Provisional Application No. 61/194,099, filed Sep. 23, 2008, by Daboussi et al., entitled PROPELLER DRIVE UNIT FOR HALE UAV; and
- U.S. Provisional Application No. 61/194,056, filed Sep. 23, 2008, by Hibbs, entitled FLUX CONCENTRATOR FOR IRONLESS MOTORS.

The present application is also related to the following applications, which are hereby incorporated by reference in their entireties:
- U.S. Non-provisional application Ser. No. 12/565,705, filed Sep. 23, 2009, entitled COMPRESSED MOTOR WINDING, by Daboussi et al;
- U.S. Non-provisional application Ser. No. 12/565,715, filed Sep. 23, 2009, entitled MOTOR AIR FLOW COOLING, by Sheppard et al; and
- U.S. Non-provisional application Ser. No. 12/565,718, filed Sep. 23, 2009, entitled FLUX CONCENTRATOR FOR IRONLESS MOTORS, by Hibbs.

BACKGROUND

Electric motors for vehicles need to have high efficiency to conserve power. Furthermore, in unmanned aerial vehicles, light weight and compact electric motors are also desirable. Thus, ironless motors are often used which can provide the benefit of no iron losses due to changing flux direction.

Motors are normally rated for the peak power and efficiency of the motor. In some applications, high part load efficiency is desired, which is high efficiency when machine is loaded at a partial load, i.e. 15% or some other percent.

What is needed is a higher efficiency compact motor.

SUMMARY

In one possible embodiment, a motor is provided including a rotor and a stator. Front cooling fins are thermally coupled to a front of the stator, and rear cooling fins thermally coupled to a rear portion of the stator. The winding is between the front and rear cooling fins.

In various embodiments, the motor has an inner and outer rotor connected together. The stator located between the inner and outer rotors has a winding with conductors encased in a thermally conductive material. A thermally conductive front yoke is mounted to a front end of the winding with front cooling fins mounted to the front yoke. A thermally conductive rear yoke mounted to a rear end of the winding with rear cooling fins mounted to the rear yoke.

In some embodiments, the front stator yoke may surrounds three sides of the front end of the winding, and in some embodiments, the rear stator yoke may surrounds three sides of the rear end of the winding.

In some embodiments, the rear cooling fins have a solid outer annular face and are oriented radially, and extend radially between the rear stator yoke and the outer annular face. In some embodiments, the rear cooling fins have a solid outer annular face and are oriented radially, and extend radially between the rear stator yoke and the outer annular face.

BRIEF DESCRIPTION OF THE DRAWINGS

The features and advantages of the present invention will be better understood with regard to the following description, appended claims, and accompanying drawings where:

DESCRIPTION

Figure 1:
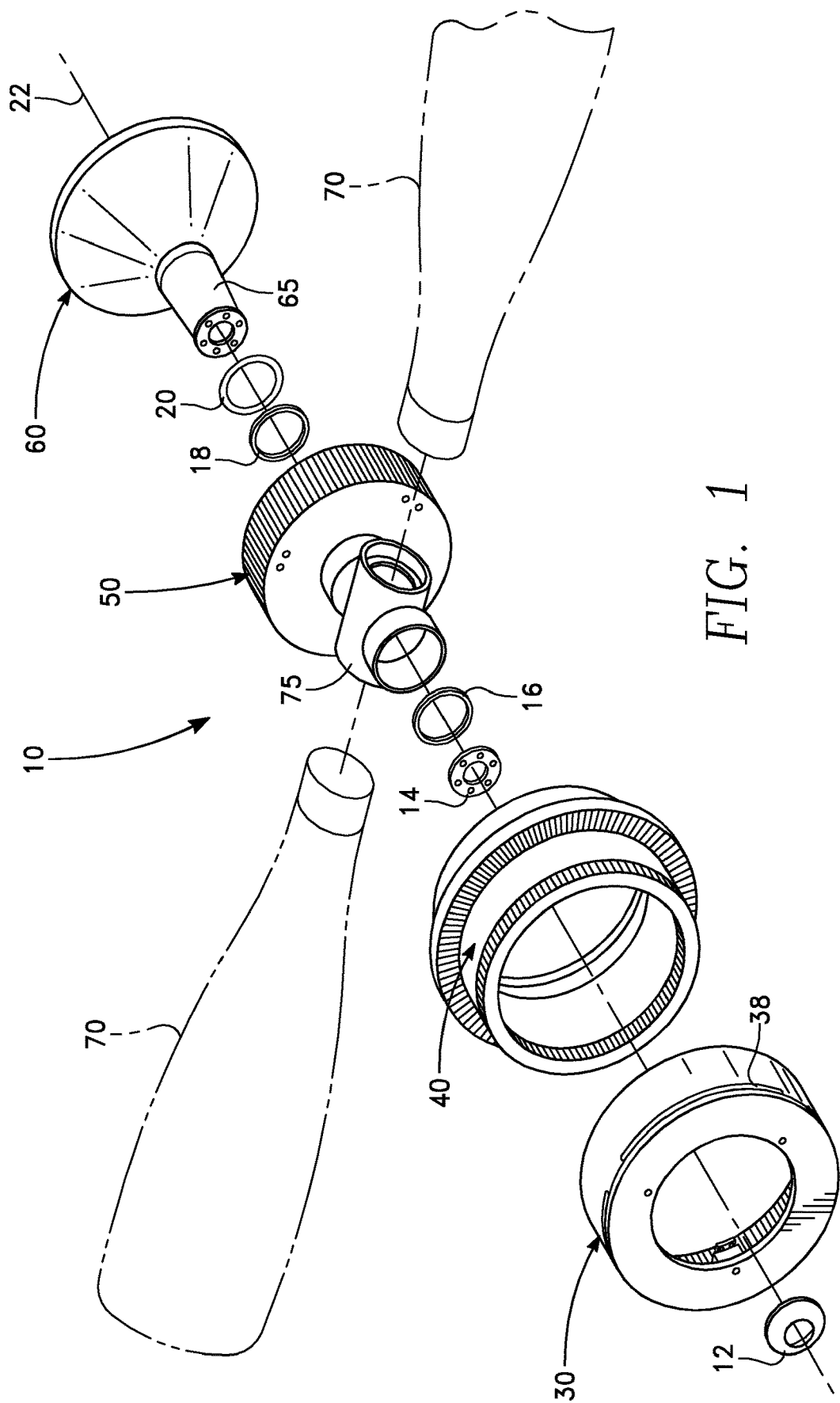
FIG. 1 shows a simplified exploded perspective view of an example motor.

FIG. 1 shows a simplified exploded perspective view of an example motor 10 along axis 22. A stator 40 is secured to a housing 60. Inner rotor 50 and outer rotor 30 are secured to each other and surround the stator 40. An optional propeller hub 75, into which propeller blades 70 are mounted, is secured to the inner rotor 50. The propeller hub 75 rotatably mounts on the shaft 65 with bearings 16 and 18. The bearings 16 and 18 are retained by retainers 20 and 14 and cover 12.

Figure 2:
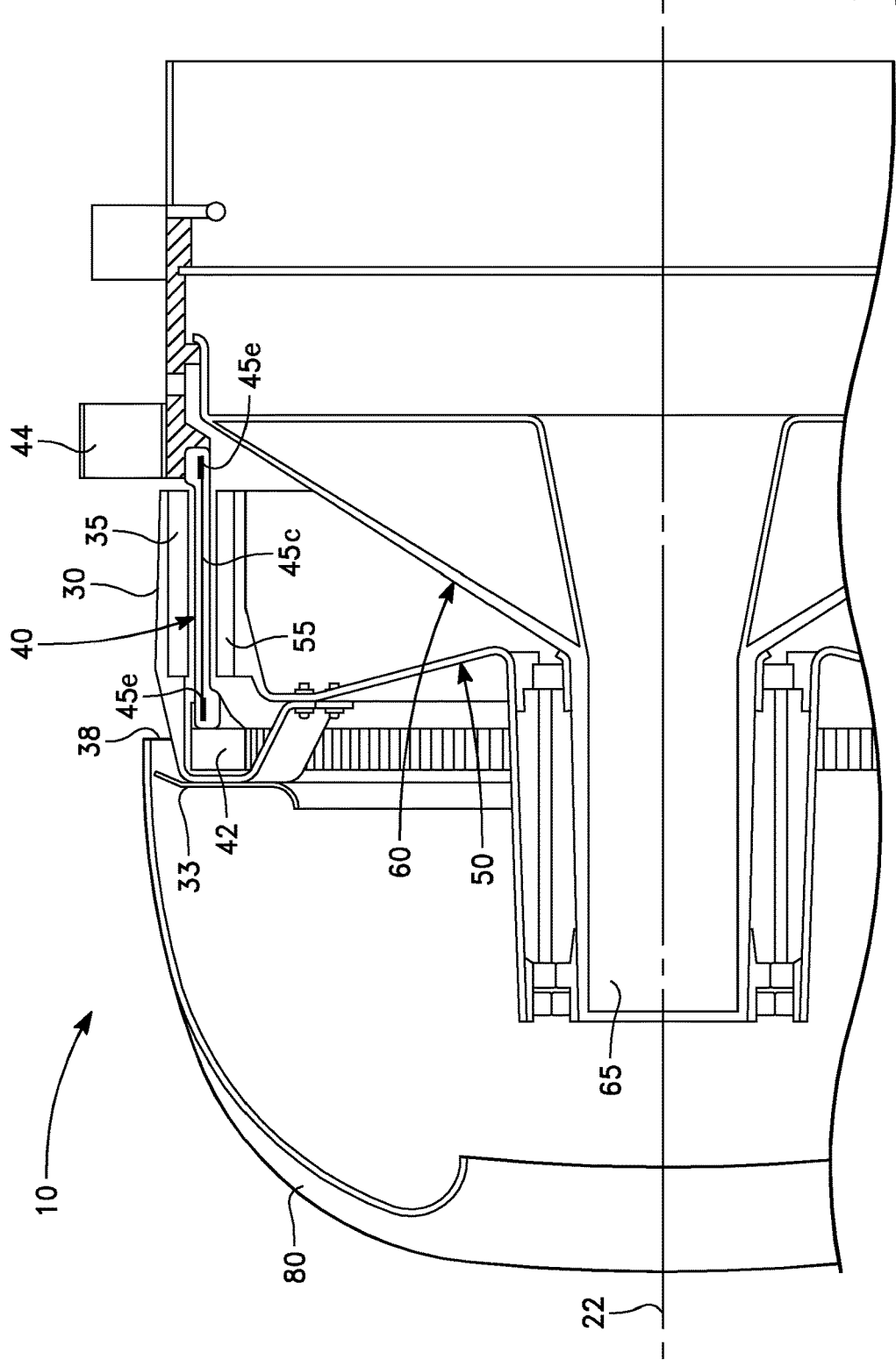
FIG. 2 shows a simplified cross sectional side view of the motor of FIG. 1 along its longitudinal axis.

FIG. 2 shows a simplified cross-sectional side view of the motor 10 of FIG. 1 along its longitudinal axis 22. The stator 40 is located between magnets 35 and 55 of the inner and outer rotors 50 and 30, respectively. The shaft 65 may be fabricated of carbon fiber or other suitable material.

Figure 3:
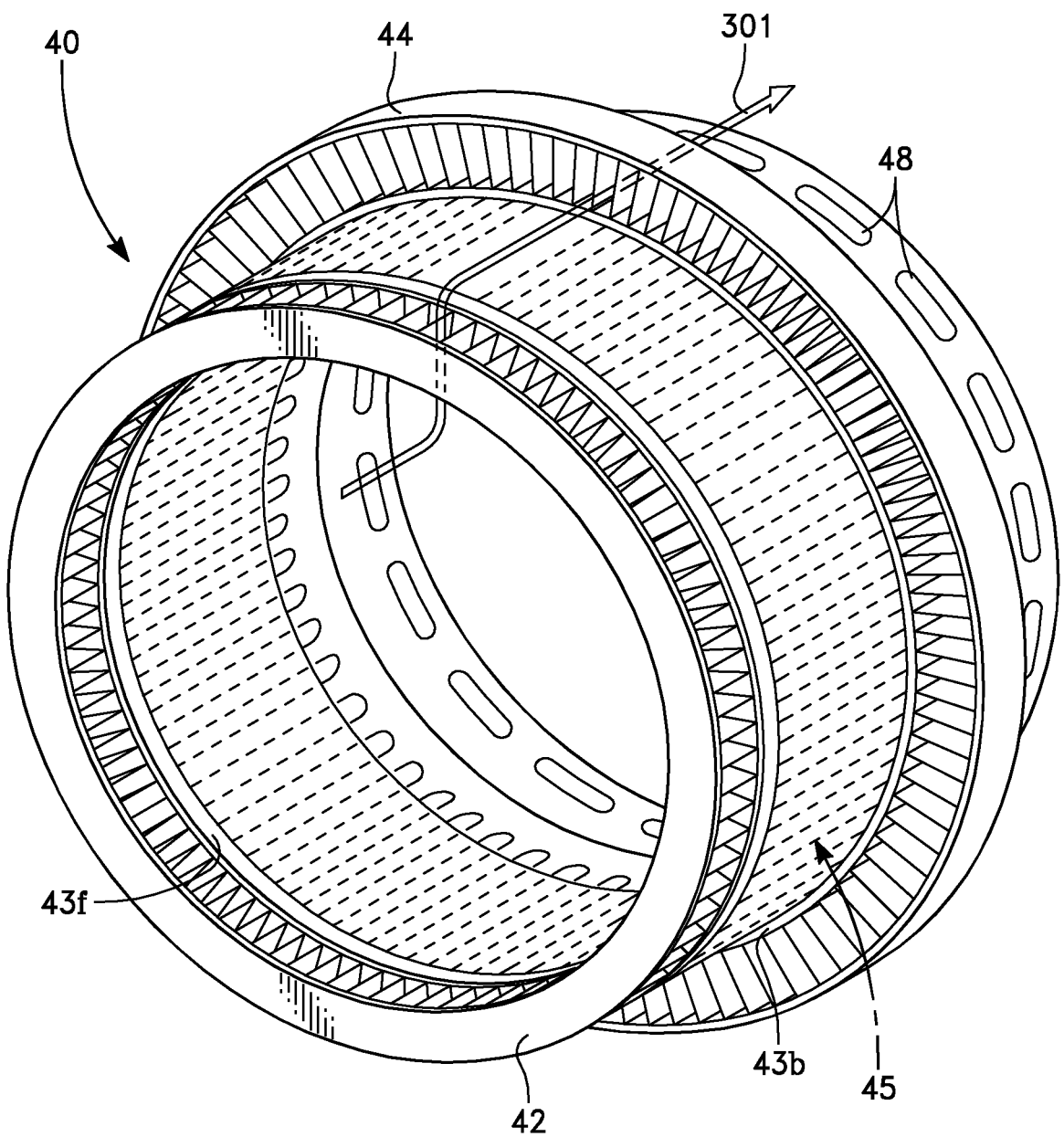
FIG. 3 shows a simplified perspective view of the stator having a winding.

FIG. 3 shows a simplified perspective view of the stator 40 having a winding 45. The winding 45 is encased within the stator 40. Cooling fins 42 and 44 are bonded to the front and back stator yoke portions 43f and 43b, respectively. FIG. 3 shows one air flow cooling path, indicated by the arrow 301, through the cooling fins 42 and 44.

Figure 4:
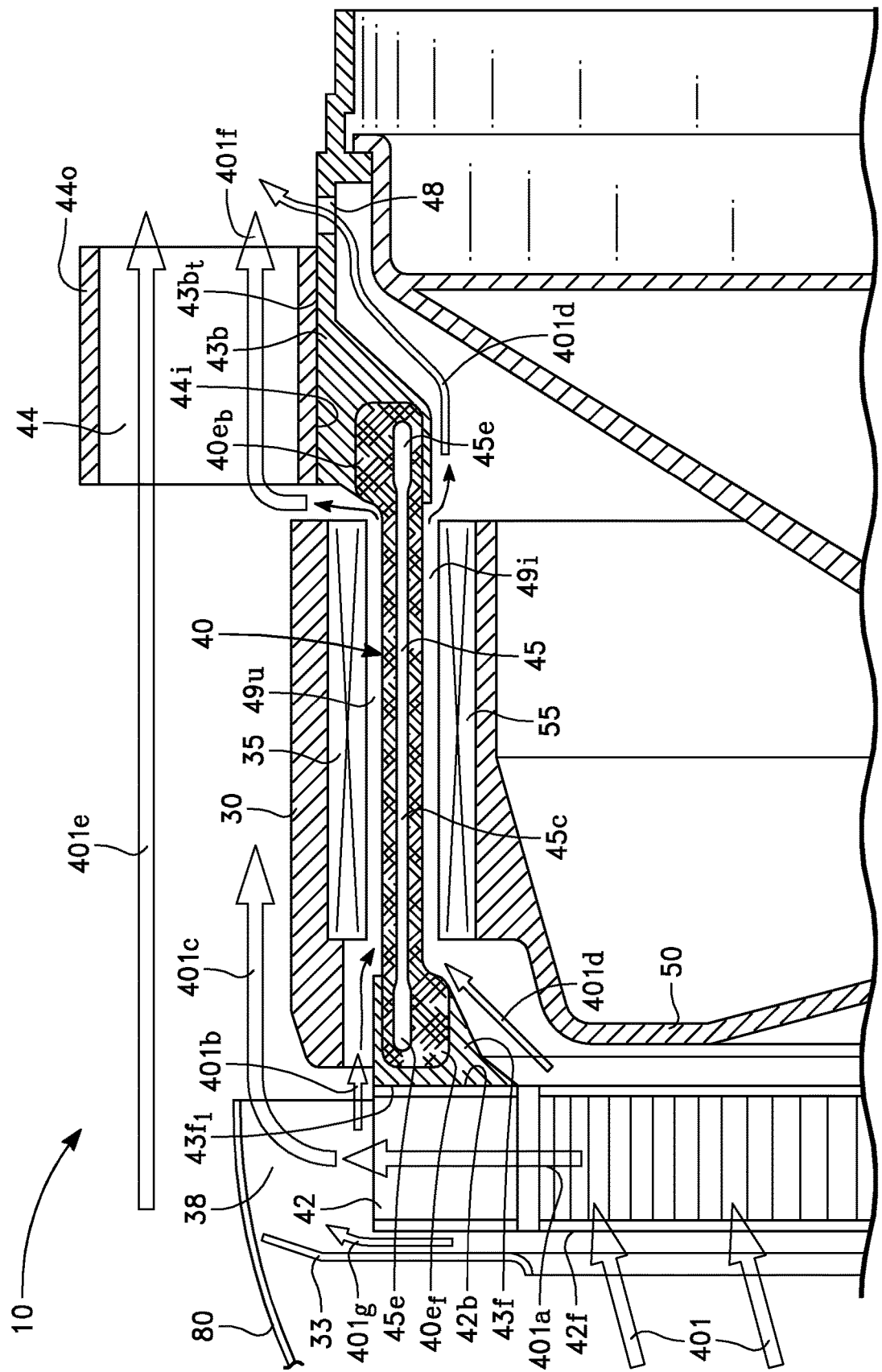
FIG. 4 shows a simplified view along a cross section of the motor of FIG. 2.

FIG. 4 shows a simplified cross section of the motor 10 of FIG. 2. The winding 45 has a compressed central region 45c. The winding 45 is compressed in the central region 45c so that more conductor material of the winding 45 can be placed between the magnets 35 and 55 and so that more conductor can be located closer to the magnets 35 and 55 of the rotors 30 and 50 to provide increased magnetic field strength in the winding 45. In this embodiment, it is not necessary that the ends 45e of the winding 45 also be compressed. This is because the ends 45e of the winding 45 do not pass between the magnets 35 and 55 of the rotors 30 and 50.

In accordance with various embodiments, for both axial and radial ironless P.M. or permanent magnet machines, the winding 45 should have a high packing density to minimize $I^2R$ losses and a construction that minimizes eddy losses. The magnets 35 and 55 in the rotor 30 and 50 pass over/under a central active region 45c of the stator winding 45, and not over/under the edges 45e of the stator winding 45. Thus, in various embodiments, the active region 45c of the winding 45 should have as much conductor, i.e. copper, as possible in the volume of the active region 45c.

Also, in various embodiments, the winding 45 should have high rigidity so that the winding 45 does not deflect and contact the magnets 35 or 55, and to adequately withstand the turn-to-turn voltages and associated forces. The winding 45 is enclosed in a suitable material, such as epoxy.

Although shown large for illustration purposes, the air gaps 49u and 49i between the stator 40 and the magnets 35 and 55 are small so that the magnets 35 and 55 provide the maximum magnetic field in the winding 45. The close proximity of the stator 40 with the magnets 35 and 55, however, can facilitate unwanted heat transfer from the stator 40 to the magnets 35 and 55 across the gaps 49u and 49i. As excessive heat can damage the magnets 35 and 55, the stator 40 is provided with front and back cooling fins 42 and 44.

Thus, the winding 45 should have a low thermal impedance path to the cooling fins 42 and 44. For most embodiments, the winding 45 is encased in epoxy mixed with a thermally conductive filler such as aluminum oxide, boron nitride, or other material that facilitates heat conduction.

The front stator yoke 43f surrounds the front end 40ef of the stator 40 on three sides to provide more surface area for heat conduction out of the stator 40 into the front stator yoke 43f. Similarly, the back yoke 43b surrounds three sides of the back end 40eb of the stator.

The cooling fins 42 and 44 may be made of aluminum or other suitable lightweight heat conductive material. The cooling fins 42 and 44 may be formed separately and bonded with a low thermal impedance bond to the stator yokes 43f and 43b, or integrally formed with them. Further it is possible in some embodiments that the front end 40ef of the stator 40 and the back end 40eb be directly connected to the cooling fins 42 and 44, respectively.

The front cooling fins 42 extend away in a forward direction from the front surface 43f1 of the front stator yoke 43f. The front cooling fins 42 are radially oriented with respect to the axis 22 (FIG. 2). The back surface 42b of the cooling fins 42 are bonded to the front surface 43f1 of the front stator yoke 43f. The front surface 42f of front cooling fins 42 is solid such that the air flows radially outward through the front cooling fins 42 with respect to the axis 22 (FIG. 2). In another embodiment not shown, the solid front surface 42f is not present. In still another embodiment not shown, the front fins are oriented radially, with air flow axially between them instead of radial air flow. Other configurations are possible.

The rear cooling fins 44 surround the back stator yoke 43b and are radially oriented with respect to the axis 22 (FIG. 2). The rear cooling fins 44 are surrounded by a solid outer ring 44o. The inner surface(s) 44i, which may be a bent over portions of each of the fins 44, is bonded to the top outer surface 43bt of the back stator yoke 43b. The air flows through the rear cooling fins 44 in a direction generally along an axis parallel with the axis 22 (FIG. 2).

Air flow 401 enters the through an optional spinner 80 and cover 33. A small portion 401d of the air flow 401 passes between the inner magnets 55 and the stator 40 through gap 49i, cooling both the inner magnets 55 and the stator 40, as well as portions of the front yoke 43f and the back yoke 43b, directly by convention. This small portion 401d exits through ports 48 (shown in FIGS. 2-4) in the back stator yoke 43b. Most of the air flow 401 passes through the front cooling fins 42 as indicated by air flow arrow 401a. After passing through the front cooling fins 42, a small portion 401b of air flow 401a passes between the upper magnets 35 and the stator 40 through the gap 49u, cooling both, the outer magnets 35 and the stator 40, as well as portions of the front yoke 43f and the back yoke 43b, directly by convention.

A large portion 401c of the air flow 401b is diverted by the cover 33 and the spinner 80 to pass through port (also shown in FIGS. 1 and 2) to flow over the outer rotor 30. Depending on the embodiment, a small portion 401g of the air flow 401 may also flow in front of the front cooling fins 42 and exit through port 38. The large portion 401c combines with the air flow 401b from the upper gap 49u to flow 401f through the rear cooling fin 44, along with airflow 401e entering directly from the air stream adjacent to the spinner 80.

In one embodiment, the combination of the cooling fin size and placement, along with the air flow over and through the components as described herein is such that the magnets are maintained at a temperature below about 70 degree Celsius and the winding is maintained at a temperature below about 80-90 degrees Celsius.

Figure 5:
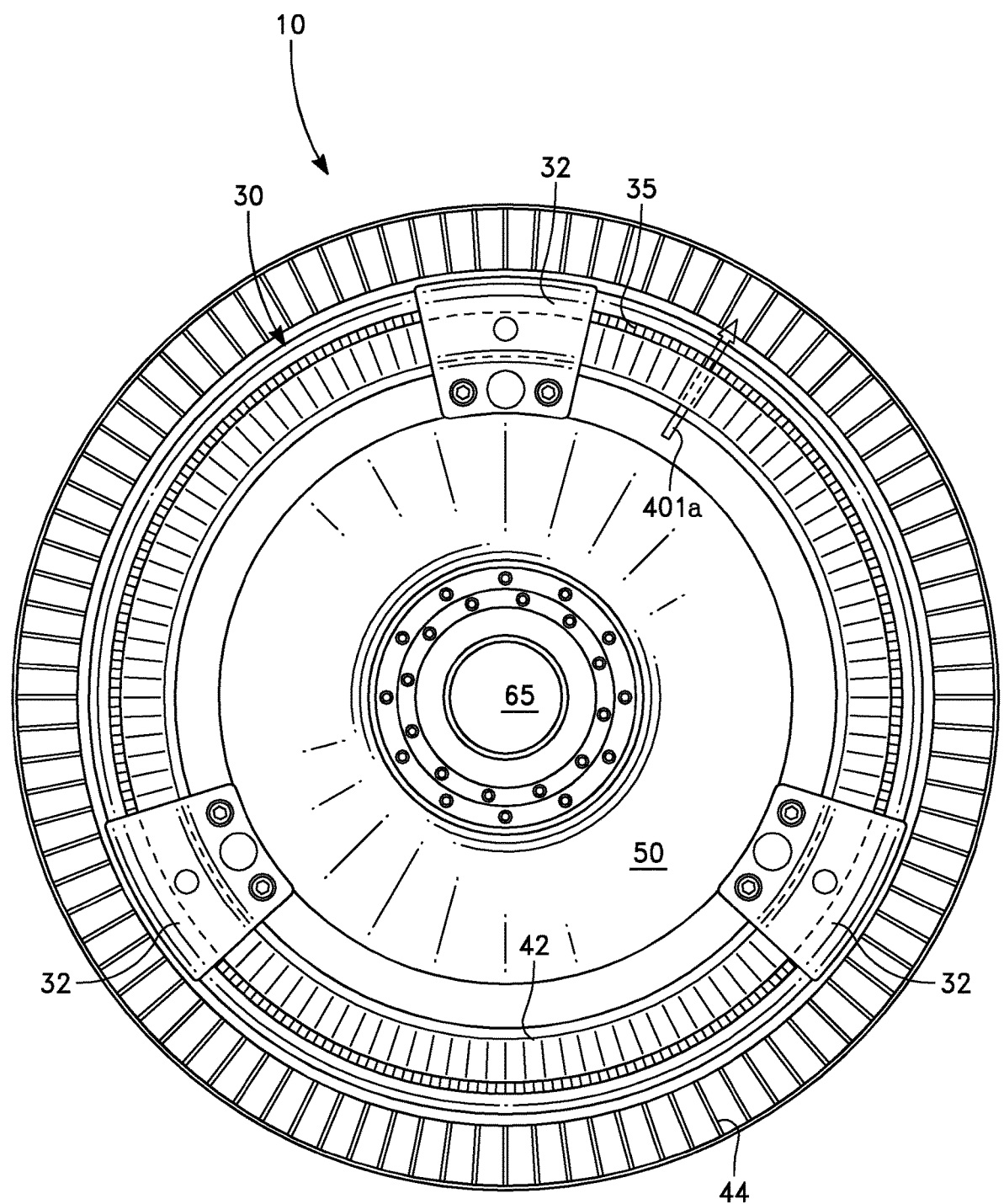
FIG. 5 shows a simplified front view of the motor.

FIG. 5 shows a simplified front view of the motor 10. The inner and outer rotors 50 and 30 are held together in this embodiment with three brackets 32, which also hold on an annular cover 33 (FIGS. 2 and 4). The air flow 401a for the front cooling fins 42 flows through the separations between the three brackets 32. Open area for airflow 401 (FIG. 4) is about 80% of the total available area, the remaining 20% is blocked by the brackets 32. Airflow 401 then flows through the separations, with most of the air flow 401a flowing through the front cooling fins 42. The air flow 401 is slowed by the spinner 80 (FIGS. 2 and 4) and fins 42 so that little flow energy is lost, then re-accelerated to free air stream velocity at port 38.

Although show in the context of aircraft, embodiments of the invention are not limited to aircraft. Further not all parts are required in all embodiments. The above described apparatuses, methods, and systems are not limited to UAVs, or aircraft. Various implementations and/or embodiments may include other motor uses, i.e. auto, industrial, etc. Further in some embodiments, the airflow may be generated, or it may be the result of motion, i.e. flying, driving, etc., of the apparatus or system.

It is worthy to note that any reference to "one embodiment" or "an embodiment" means that a particular feature, structure, or characteristic described in connection with the embodiment may be included in an embodiment, if desired. The appearances of the phrase "in one embodiment" in various places in the specification are not necessarily all referring to the same embodiment.

The illustrations and examples provided herein are for explanatory purposes and are not intended to limit the scope of the appended claims. This disclosure is to be considered an exemplification of the principles of the invention and is not intended to limit the spirit and scope of the invention and/or claims of the embodiment illustrated.

Those skilled in the art will make modifications to the invention for particular applications of the invention.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

Having described this invention in connection with a number of embodiments, modification will now certainly suggest itself to those skilled in the art. The example embodiments herein are not intended to be limiting, various configurations and combinations of features are possible. As such, the invention is not limited to the disclosed embodiments, except as required by the appended claims.

What is claimed is:

1. A motor comprising:
    a) a permanent magnet rotor; and
    b) a stator comprising:
        i) front cooling fins thermally coupled to a front of the stator via a front stator yoke;
        ii) a ring of rear cooling fins thermally coupled to a rear portion of the stator via a rear stator yoke, wherein the rear cooling fins have a solid outer annular face, the rear cooling fins oriented radially and extend radially between the rear stator yoke and the outer annular face; and
        iii) a winding between and separating the front stator yoke and the front cooling fins from the rear stator yoke and the ring of rear cooling fins.

2. The motor of claim 1, wherein the front stator yoke is mounted to a front end of the winding and surrounds three sides of the front end of the winding.

3. The motor of claim 2, wherein the front cooling fins have a solid front annular face, the front cooling fins being oriented radially and extending laterally between the front annular face and the front stator yoke.

4. The motor of claim 1, wherein the rear stator yoke is mounted to a rear end of the winding and surrounds three sides of the rear end of the winding.

5. The motor of claim 1, wherein the front cooling fins have an outer radius and an inner radius, the outer radius being about a same outer radius as the winding.

6. The motor of claim 5, wherein the rotor comprises and outer rotor, and wherein the rear cooling fins have an outer radius and an inner radius, the inner radius being about at a same radius as an outer radius of the outer rotor.

7. The motor of claim 1, wherein the rotor comprises and outer rotor, and wherein the rear cooling fins have an outer radius and an inner radius, the inner radius being about at a same radius as an outer radius of the outer rotor.

8. The motor of claim 1, wherein the motor is an aircraft motor comprising a spinner, and wherein the front cooling fins are housed within the spinner.

9. A motor comprising:
    a) an inner and outer rotor connected together;
    b) a stator between the inner and outer rotors, the stator comprising:
        i) a coreless winding comprising conductors encased in a thermally conductive material;
        ii) a thermally conductive front yoke mounted to a front end of the winding;
        iii) front cooling fins mounted to the front yoke;
        iv) a thermally conductive rear yoke mounted to a rear end of the winding; and
        v) rear cooling fins mounted to and surrounding the rear yoke, wherein the rear cooling fins have a solid outer annular face, the rear cooling fins being oriented radially and extending radially between the rear stator yoke and the outer annular face; and
    c) wherein the winding is disposed between and separates the front yoke and the front cooling fins from the rear yoke and the rear cooling fins.

10. The motor of claim 9, wherein the front cooling fins are mounted to a front end of the front yoke.

11. The motor of claim 10, wherein the front yoke surrounds three sides of the front end of the winding, and wherein the rear yoke surrounds three sides of the rear end of the winding.

12. The motor of claim 9, wherein the rear cooling fins are mounted to an outer surface of the rear yoke.

13. An aircraft motor comprising:
    a) an inner and outer rotor connected together; and
    b) a stator between the inner and outer rotors, the stator comprising:
        i) a coreless winding comprising conductors encased in a thermally conductive material;
        ii) a thermally conductive front yoke mounted to a front end of the winding;
        iii) front cooling fins mounted to the front yoke, the front cooling fins have a solid front annular face, the front cooling fins being oriented radially and extending laterally between the front annular face and the front yoke;
        iv) a thermally conductive rear yoke mounted to a back end of the winding; and
        v) rear cooling fins mounted to the rear yoke the rear cooling fins have a solid outer annular face, the rear cooling fins oriented radially and extend radially between the rear yoke and the outer annular face.

14. The motor of claim 13, wherein the front cooling fins have an outer radius and an inner radius, the outer radius being about a same outer radius as the winding.

15. The motor of claim 14, wherein the rear cooling fins have an outer radius and an inner radius, the inner radius being about at a same radius as an outer radius of the outer rotor.

16. The motor of claim 13, wherein the rear cooling fins have an outer radius and an inner radius, the inner radius being about at a same radius as an outer radius of the outer rotor.

17. The motor of claim 13, further comprising a spinner, and wherein the front cooling fins are housed within the spinner.

\* \* \* \* \*